United States Patent
Han et al.

(10) Patent No.: US 11,210,343 B2
(45) Date of Patent: Dec. 28, 2021

(54) GRAPH DATA PROCESSING METHOD AND APPARATUS THEREOF

(71) Applicant: POSTECH ACADEMY-INDUSTRY FOUNDATION, Pohang-si (KR)

(72) Inventors: Wook-Shin Han, Daejeon (KR); Seongyun Ko, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 232 days.

(21) Appl. No.: 16/545,951

(22) Filed: Aug. 20, 2019

(65) Prior Publication Data

US 2020/0387548 A1 Dec. 10, 2020

(30) Foreign Application Priority Data

Jun. 10, 2019 (KR) ........................ 10-2019-0067897

(51) Int. Cl.
*G06F 16/901* (2019.01)
*G06F 16/903* (2019.01)

(52) U.S. Cl.
CPC .... *G06F 16/9024* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 10,068,033 B2 | 9/2018 | Huang et al. | |
| 10,534,657 B2 * | 1/2020 | Depner | G06F 9/5038 |
| 10,606,892 B1 * | 3/2020 | Broecheler | G06F 16/9024 |
| 10,810,210 B2 * | 10/2020 | Choudhury | G06F 21/552 |
| 2012/0066206 A1 * | 3/2012 | Chappell | G06F 16/24532 |
| | | | 707/713 |

(Continued)

FOREIGN PATENT DOCUMENTS

| | | |
|---|---|---|
| JP | 2017509043 A | 3/2017 |
| KR | 20160014111 A | 2/2016 |

(Continued)

OTHER PUBLICATIONS

Ko, et al., "TurboGraph++: A Scalable and Fast Graph Analytics System", SIGMOD '18 Proceedings of the 2018 International Conference on Management of Data pp. 395-410, SIGMOD'18, Jun. 10-15, 2018, Houston, TX, USA.

(Continued)

*Primary Examiner* — Uyen T Le
(74) *Attorney, Agent, or Firm* — Steinfl + Bruno, LLP

(57) ABSTRACT

A graph data processing that loads subgraph data including a predetermined number of source vertices on the basis of a memory requirement among graph data including multiple vertices and edges stored in a storage and edge list based on the source vertices, performing a first level process to identify a first arrival vertex connected to each of the source vertices, loading the edge list on the basis of a source vertex of which the first arrival vertex is identified, performing a second level process to identify a second arrival vertex connected to the source vertex of which the first arrival vertex is identified, and processing a query on the basis of the source vertex, the first arrival vertex, and the second arrival vertex.

15 Claims, 19 Drawing Sheets

(56) References Cited

U.S. PATENT DOCUMENTS

| | | | |
|---|---|---|---|
| 2016/0063037 A1* | 3/2016 | Savkli | G06F 16/9024 |
| | | | 707/722 |
| 2016/0306897 A1 | 10/2016 | Huang et al. | |
| 2017/0068746 A1* | 3/2017 | Levin | G06F 16/278 |
| 2017/0124452 A1 | 5/2017 | Tucker et al. | |
| 2017/0316591 A1 | 11/2017 | Viswanathan et al. | |
| 2018/0197076 A1 | 7/2018 | Paik et al. | |
| 2021/0004374 A1* | 1/2021 | Xia | G06F 16/2455 |

FOREIGN PATENT DOCUMENTS

| | | | |
|---|---|---|---|
| KR | 20160072305 A | 6/2016 | |
| KR | 20160093237 A | 8/2016 | |
| KR | 101872241 B1 | 6/2018 | |
| KR | 20180062934 A | 6/2018 | |
| WO | 2012/091846 A2 | 7/2012 | |

OTHER PUBLICATIONS

Office Action for Korean Patent Application No. 10-2019-0067897, filed on Jun. 10, 2019 on behalf of Postech Acad Ind Found. Issuance Date: Sep. 21, 2020. 10 Pages.

Notice of Preliminary Rejection for Korean Patent Application No. 10-2019-0067897 filed on Jun. 10, 2019 on behalf of Postech Research and Business Development Foundation. Issuance Date: Mar. 30, 2021. 9 pages. KR Original + English Translation.

\* cited by examiner

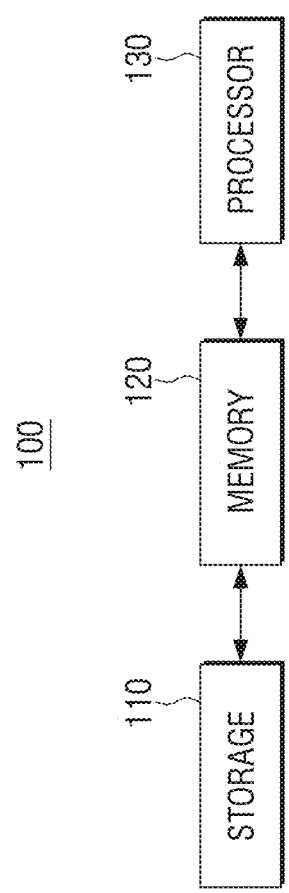

FIG. 2A

Algorithm 1: PROCESSNWSM

Input: Level $l$, VertexStream $vs^l$, AdjStream $adjs^l$
1:  $q_{new}$ = COMPUTEQVALUE(k)
2:  if ($q_{new} > q$) then
3:     EXECUTEBBP($q_{new}$)
4:  end
5:  if ($l = 1$) then
6:     spawn GATHER();
7:  end
8:  // overlap scatter phase with gather phase
9:  while $vw^l$ = READ ($vs^l$.NEXTWINDOWRANGE()) do
10:     foreach $j \in [1, pq/\lfloor \frac{q}{q_{new}} \rfloor]$ do
11:         $LGB^l$.CLEAR();
12:         while $adjw^l$ = ASYNCREAD
            ($adjs^l$.NEXTWINDOWRANGE(), GETRANGE($vw^l$),
            GETRANGE($j$), $adj\_scatter^l$) do
13:             wait until the above ASYNCREAD completes;
14:             if ($l \neq k$) then
15:                 PROCESSNWSM ($l + 1$, VertexStream($vs^{l+1}$),
                  AdjStream($vs^{l+1}$));
16:             end
17:         end
18:         ASYNCSEND($LGB^l$)
19:     end
20:  end
21:  if ($l = 1$) then
22:     GLOBALBARRIER();
23:     spawn GATHERSPILLEDUPDATES(UpdateStream(updates in disk));
24:     spawn APPLY(VertexStream(all vertices in my machine));
25:  end

FIG. 2B

Algorithm 2: GATHER

Input: UpdateStream $us$

1: $mid$ = GETMYMACHINEID();
2: foreach $Update\ u \in us$ do
3:     if $u.vid \in \left[\frac{|V|}{p}(mid-1), \frac{|V|}{p}(mid-1) + \frac{|V|}{p*qnew}\right)$ then
4:        apply $u$ to the gather buffer
5:     else
6:        spill $u$ to disk with partitioning
7:     end
8: end

FIG. 2C

Algorithm 3: GATHERSPILLEDUPDATES

Input: UpdateStream[] us

1: foreach PartitionID $pid \in [2, q_{new}]$ do
2:     foreach Update $u$ in $us[i]$ do
3:         apply $u$ to the gather buffer for the current $z \gg w$
4:     end
5: end

FIG. 2D

Algorithm 4: APPLY

Input: VertexStream $vs$

1: while $vw$ = READ($vs$,NEXTWINDOWRANGE()) do
2:     wait until the gather task finishes merging spilled results for $vw$;
3:     foreach $v \in vw$ do
4:         $vertex\_apply(v)$;
5:     end
6: end

PR.

TC.

GRAPH DATA PROCESSING METHOD AND APPARATUS THEREOF

CROSS-REFERENCE TO RELATED APPLICATIONS

This application is based on and claims priority under 35 U.S.C. 119 to Korean Patent Application No. 10-2019-0067897, filed on Jun. 10, 2019, in the Korean Intellectual Property Office, the disclosure of which is herein incorporated by reference in its entirety.

BACKGROUND

Field

Apparatuses and methods consistent with the disclosure relate to a graph data processing method and a graph data processing apparatus, and more particularly, to a graph data processing method and a graph data processing apparatus which process a large-scale graph in a distributed processing.

Description of the Related Art

As the magnitude of graph data increases rapidly, many researches have been conducted to efficiently analyze large-scale graph data. Research into analysis of large-scale graph data may be classified as two methods.

A first method is a main memory-based processing method that increases the number of computing nodes until an input graph may be divided and loaded into memories of distributed computing nodes. Typical systems include GraphX, Pregel+, GRAPE, and Gemini. However, in the main memory-based processing method, a size of a data structure which repeatedly stores repetition of vertices and edges and maintaining intermediate calculation results for distributed processing explosively increases, and thus, a size of an actual memory required for graph processing may be even larger than the input graph. Also, in the main memory-based processing method, it is very difficult to precisely calculate a memory size required for processing a certain query in a certain graph, it is difficult to determine whether a computing node and an overall memory size are sufficient. Therefore, existing systems have a memory shortage problem in analyzing large-scale graph data.

A second method utilizes an external storage apparatus such as a disk or etc. Large graph data is stored in a disk and a graph is partially processed through input/output between the disk and a memory. Typical systems are Chaos and HybridGraph. However, these systems have a disadvantage in that a processing speed of a query is very slow because processing efficiency is very low as compared with the main memory-based systems mentioned above.

In evaluating distributed large-scale graph processing systems, fast query processing, as well as large-scale graph processing, is also an important factor. Chaos is a highly scalable system which is capable of processing a large-scale graph by utilizing a disk, without a memory shortage phenomenon. However, Chaos has a disadvantage in that a processing speed is significantly slow as compared with the latest main memory-based systems (Gemini and Pregel+) because the disk I/O is too large and data processing is inefficient when processing queries. Also, HybridGraph, another disk-based system, tried to improve the processing speed through a method of not inputting and outputting a message to or from a disk, but it still has a disadvantage that a processing time is very slow as compared with the latest main memory-based systems.

Several systems that process graphs in a distributed environment have proposed various partitioning techniques to achieve a balanced workload among distributed computing nodes. Most partitioning techniques focus on reducing network I/O traffic in the distributed environment. However, in a modern cluster environment with high-speed network equipment, network traffic is no longer a bottleneck. In addition, METIS, one of the latest partitioning programs, requires large memory requirement for partitioning, and thus, a program execution may fail due to a memory shortage phenomenon even when a small graph is partitioned.

Therefore, a technology capable of stably partitioning a large graph and processing large-scale graph data without memory shortage is necessary.

SUMMARY OF THE DISCLOSURE

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a method for stably processing graph data partitioning, which limits a memory requirement in performing a query, and achieving a balanced workload between apparatuses when a large-scale graph is processed in a plurality of apparatuses in a distributed manner, and a graph data processing apparatus.

According to an embodiment of the disclosure, a graph data processing method includes: loading subgraph data including a predetermined number of source vertices on the basis of a memory requirement among graph data including a plurality of vertices and edges stored in a storage and edge list based on the source vertices; performing a first level process to identify a first arrival vertex connected to each of the source vertices; loading the edge list on the basis of a source vertex of which the first arrival vertex is identified; performing a second level process to identify a second arrival vertex connected to the source vertex of which the first arrival vertex is identified; and processing a query on the basis of the source vertex, the first arrival vertex, and the second arrival vertex.

The graph data processing method may further include: loading the edge list on the basis of a source vertex on which a (k−1)-th arrival vertex is identified; and performing k-th level process to identify a k-th arrival vertex connected to a source vertex of which the (k−1)-th arrival vertex is identified, wherein the processing of the query includes processing a polygon connection relation query having n apexes greater than 3 apexes on the basis of the source vertex, the first arrival vertex, the second arrival vertex, the (k−1)-th arrival vertex, and the k-th arrival vertex and a connection relation pattern query. Here, k is a natural number of $3 \leq k \leq n-1$.

The performing of the first level process may include setting a first window including a predetermined number or less of edges connected to the source vertices, sequentially sliding the set first window, and identifying the first arrival vertex on the basis of the source vertex included in a region where the first window is located and the edge list.

The performing of the second level process may include setting a second window including an edge connected to the source vertex on the basis of the source vertex of which the first arrival vertex is identified, sequentially sliding the set second window, and identifying a second arrival vertex on the basis of the source vertex that is included in a region where the first window is located and the first arrival vertex is identified and the edge list.

The performing of the second level process may include identifying, by the processor, a second arrival vertex connected to the source vertex of which the first arrival vertex is identified in a currently located region of the second window, loading, by the storage, an edge list based on the source vertex of which the first arrival vertex corresponding to a region where the second window is to be located next time to the memory, and transmitting, by a communication interface, update information of a second arrival vertex identified in a previously located region of the second window, whereby the storage, the processor, and the communication interface to operate simultaneously in parallel.

The performing of the first level process may include arranging the source vertex and the first arrival vertex in ascending order on the basis of numbers respectively assigned to the source vertex and the first arrival vertex, and the performing of the second level process may include arranging the source vertex of which the first arrival vertex is identified and the second arrival vertex in ascending order on the basis of numbers respectively assigned to the source vertex of which the first arrival vertex is identified and the second arrival vertex.

The performing of the first level process may include identifying a connection relation on the basis of an adjacent source vertex having a number larger than the number of the source vertex if the number of the source vertex is smaller than the number of the first arrival vertex and identifying a connection relation on the basis of an adjacent first arrival vertex having a number larger than the number of the first arrival vertex if the number of the first arrival vertex is smaller than the number of the source vertex, and the performing of the second level process may include identifying a connection relation on the basis of a source vertex of which an adjacent first arrival vertex having a number larger than the number of the source vertex of which the first arrival vertex is identified if the number of the source vertex of which the first arrival vertex is identified is smaller than the number of the second arrival vertex, and identifying a connection relation on the basis of an adjacent second arrival vertex having a number larger than the number of the second arrival vertex if the number of the second arrival vertex is smaller than the number of the source vertex of which the first arrival vertex is identified.

According to another embodiment of the disclosure, a graph data processing apparatus includes: a storage configured to store graph data including a plurality of vertices and edges; a memory configured to load subgraph data on the basis of a memory requirement among the graph data; and a processor configured to process a query on the basis of the loaded subgraph data, wherein the memory loads a predetermined number of source vertices of the subgraph data and an edge list based on the source vertices and loads an edge list based on a source vertex of which a first arrival vertex is identified, and the processor performs a first level process to identify a first arrival vertex connected to each of the source vertices on the basis of the edge list based on the source vertices loaded into the memory, performs a second level process to identify a second arrival vertex connected to the source vertex of which the first arrival vertex is identified on the basis of the edge list based on the source vertex of which the first arrival vertex is identified loaded into the memory, and processes a query on the basis of the source vertex, the first arrival vertex, and the second arrival vertex.

The memory may load the edge list on the basis of a source vertex on which a (k−1)-th arrival vertex is identified, and the processor may perform k-th level process to identify a k-th arrival vertex connected to a source vertex of which the (k−1)-th arrival vertex is identified, and process a polygon connection relation query having n apexes greater than 3 apexes on the basis of the source vertex, the first arrival vertex, the second arrival vertex, the (k−1)-th arrival vertex, and the k-th arrival vertex and a connection relation pattern query. Here, k is a natural number of 3≤k≤n−1.

In the first level process, the processor may set a first window including a predetermined number or less of edges connected to the source vertices, sequentially slide the set first window, and identify the first arrival vertex on the basis of the source vertex included in a region where the first window is located and the edge list.

In the second level process, the processor may set a second window including an edge connected to the source vertex on the basis of the source vertex of which the first arrival vertex is identified, sequentially slide the set second window, and identify a second arrival vertex on the basis of the source vertex that is included in a region where the first window is located and the first arrival vertex is identified and the edge list.

The graph data processing apparatus may further include a communication interface, wherein the processor may identify a second arrival vertex connected to the source vertex of which the first arrival vertex is identified in a currently located region of the second window in the second level process, control the storage to load an edge list based on the source vertex of which the first arrival vertex corresponding to a region where the second window is to be located next time to the memory, and control the communication interface to transmit update information of a second arrival vertex identified in a previously located region of the second window, whereby the storage, the processor, and the communication interface simultaneously operate in parallel.

Meanwhile, in the first level process, the processor may arrange the source vertex and the first arrival vertex in ascending order on the basis of numbers respectively assigned to the source vertex and the first arrival vertex, and in second level process, the processor may arrange the source vertex of which the first arrival vertex is identified and the second arrival vertex in ascending order on the basis of numbers respectively assigned to the source vertex of which the first arrival vertex is identified and the second arrival vertex.

In the first level process, the processor may identify a connection relation on the basis of an adjacent source vertex having a number larger than the number of the source vertex if the number of the source vertex is smaller than the number of the first arrival vertex, and identify a connection relation on the basis of an adjacent first arrival vertex having a number larger than the number of the first arrival vertex if the number of the first arrival vertex is smaller than the number of the source vertex, and in the second level process, the processor may identify a connection relation on the basis of a source vertex of which an adjacent first arrival vertex having a number larger than the number of the source vertex of which the first arrival vertex is identified if the number of the source vertex of which the first arrival vertex is identified is smaller than the number of the second arrival vertex, and identify a connection relation on the basis of an adjacent second arrival vertex having a number larger than the number of the second arrival vertex.

According to an embodiment of the disclosure, a system includes a plurality of graph data processing apparatuses described above, and each of the plurality of graph data processing apparatuses may store graph data including the source vertices and the edges in a distributed manner according to a round robin method on the basis of the number of the source vertices and the edges.

As described above, according to various embodiments of the disclosure, the graph data processing method and the graph data processing apparatus may process large-scale graph data without a memory shortage phenomenon.

Furthermore, the graph data processing method and the graph data processing apparatus may stably partition the large-scale graph data and achieve a balanced workload between apparatuses.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the disclosure will be more apparent by describing certain embodiments of the disclosure with reference to the accompanying drawings, in which:

FIG. 1 is a block diagram of a graph data processing apparatus according to an embodiment of the disclosure.

FIG. 2A is a view illustrating an algorithm for identifying vertices and edges according to an embodiment of the disclosure.

FIG. 2B is a view illustrating a global gathering operation algorithm according to an embodiment of the disclosure.

FIG. 2C is a view illustrating an update gather working algorithm according to an embodiment of the disclosure.

FIG. 2D is a view illustrating an application working algorithm according to an embodiment of the disclosure.

DETAILED DESCRIPTION OF THE EMBODIMENTS

Figure 3:
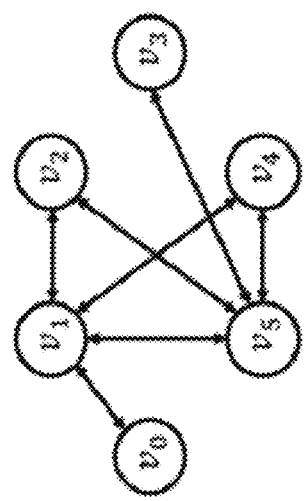
FIG. 3 is a view illustrating an embodiment of a data graph.

Hereinafter, various embodiments will be described in detail with reference to the accompanying drawings. The embodiments described herein may be variously modified. Specific embodiments may be illustrated in the drawings and described in detail in the detailed description. It should be understood, however, that the specific embodiments disclosed in the accompanying drawings are intended only to facilitate understanding of various embodiments. Therefore, the technical idea is not limited by the specific embodiments disclosed in the accompanying drawings but includes all equivalents or alternatives falling within the spirit and scope of the disclosure.

Terms including ordinals, such as first, second, etc., may be used to describe various elements but such elements are not limited to the above terms. The above terms are used only for the purpose of distinguishing one component from another.

In this specification, the terms "comprise" or "have" and the like, are intended to specify the presence of stated features, integers, steps, operations, elements, parts, or combinations thereof, but do not preclude the presence or addition of one or more other features, integers, steps, operations, elements, components, or combinations thereof. It is to be understood that when an element is referred to as being "connected" to another element, it can be directly on or directly connected to the other element or layer, or intervening elements or layers may be present. Meanwhile, when an element is referred to as being "directly connected" to another element, it should be understood that there are no other elements in between.

In the meantime, "module" or "part" for components used in the present specification performs at least one function or operation. Also, "module" or "part" may perform functions or operations by hardware, software, or a combination of hardware and software. Also, a plurality of "modules" or a plurality of "parts" except for a "module" or "part" to be performed in a specific hardware or performed in at least one processor may be integrated into at least one module. The singular expressions include plural expressions unless the context clearly dictates otherwise.

In the description of the disclosure, order of each step should be understood to be non-limiting, unless a preceding step must be performed logically and temporally before a subsequent step. In other words, except for the exceptional case above, even if a process described as a subsequent step is performed before a process described as a preceding step, the nature of the disclosure is not affected and the claim should be defined regardless of order of the steps. In this disclosure, "A or B" is defined to refer to include both A and B as well as selectively indicating either A or B. It is also to be understood that the term "comprise" is intended to encompass other elements in addition to the elements listed as being included.

Encryption/decryption may be applied to an information (data) transmission process performed in this disclosure as necessary, and the expression describing a process of transmitting information (data) in the specification and claims should be construed to include all the cases of encryption/decryption, although not mentioned. Expression such as "transmission (transfer) from A to B" or "reception by A from B" includes transmission (transfer) or reception with another medium in between and does not necessarily indicate only direct transmission (transfer) or reception from A to B.

Only essential components necessary for explanation of the disclosure are described in this specification, and components not related to the essence of the disclosure are not mentioned. It should not be construed in an exclusive sense that only the recited elements are included, but should be interpreted in a non-exclusive sense to include other elements as well.

In addition, in the description of the disclosure, when it is determined that a detailed description of known functions or components related thereto may unnecessarily obscure the gist of the disclosure, the detailed description thereof will be abbreviated or omitted. Meanwhile, each embodiment may be independently implemented or operated, but each embodiment may be implemented or operated in combination.

FIG. 1 is a block diagram of a graph data processing apparatus according to an embodiment of the disclosure.

Referring to FIG. 1, the graph data processing apparatus 100 may include a storage 110, a memory 120, and a processor 130.

The storage 110 may store graph data. The graph data may be entire graph data, and in case of large-scale graph data, the storage 110 may store a portion of the large-scale graph data. The graph data may include a vertex and an edge connected from the vertex to another vertex. That is, the storage 110 may store graph data including a plurality of vertices and edges.

The memory 120 may load the subgraph data on the basis of a memory requirement among the graph data. The subgraph data may include a source vertex and an edge list based on the source vertex. In an embodiment, the memory 120 may divide regions and store source vertices in the divided regions, respectively.

For example, the storage 110 may include a hard disk, a Solid State Drive (SSD), a flash memory, a multimedia card, a magnetic memory, a magnetic disk, an optical disk, and the like, and the memory 120 may include a Random-Access Memory (RAM), a Read-only Memory (ROM), a buffer, a cache, or the like within the processor 130.

The processor 130 may identify a connection relation connected to a source vertex. That is, the processor 130 may load a predetermined number of source vertices of subgraph data and an edge list based on the source vertices and identify a first arrival vertex connected to each of the source vertices. Meanwhile, the processor 130 may perform a query according to a user command. If the query is a query identifying a connection relation of a triangle (or polygon), the processor 130 may repeat a process similar to the process described above.

For example, when the processor 130 performs a query to identify a connection relation of a triangle, the processor 130 may identify the first arrival vertex through the above-described procedure. The processor 130 may then load the edge list on the basis of the identified first arrival vertex. The processor 130 may identify a second arrival vertex on the basis of the identified first arrival vertex and the loaded edge list. The processor 130 may perform a query to identify a graph of the triangle on the basis of the source vertex, the identified first arrival vertex, and the identified second arrival vertex. If the processor 130 performs a query to identify a polygonal graph, the above process may be repeated to perform a query to identify the polygonal graph. A specific example of performing a query to identify a triangular graph will be described later.

Meanwhile, the graph data processing apparatus 100 may further include a communication interface (not shown). The communication interface may synchronize information between each vertex by transmitting updated information as a result of executing the query to another apparatus.

FIG. 2A is a view illustrating an algorithm for identifying vertices and edges according to an embodiment of the disclosure.

A distributed data processing process may be performed in order of a distributing step (or a scattering step), a gathering step, and an applying step. The algorithm disclosed in FIG. 2A is an algorithm performed in the following process.

A ProcessNWSM function illustrated in FIG. 2A may receive a level 1 (first level), a vertex stream of the first level ($vs^1$), and an adjacency list stream ($adjs^1$) of the first level as arguments. The level 1 may refer to a process of identifying an arrival vertex. For example, the process of identifying the first arrival vertex may be a first level, and a process of identifying a second arrival vertex may be a second level. The vertex stream may be an initial vertex to identify a connection relation. For example, a vertex stream of the first level described above may be at least one source vertex, and a vertex stream of the second level may be at least one first arrival vertex. The adjacency list stream may be an edge list connected from the initial vertex.

An embodiment of the disclosure may load subgraph data on the basis of a memory requirement required for graph data processing. A minimum memory requirement is related to a partitioning parameter q. Therefore, the processor may calculate $q_{new}$ as the minimum q value to perform a query without a memory shortage phenomenon. q may be a parameter used to partition the graph data in a balanced manner for each apparatus. If the $q_{new}$ value is greater than q, partitioning should be further performed. If $q_{new}$ is less than q, the current graph partitioning may be used.

Before starting a partitioning step, each apparatus may perform a global gather asynchronous task to gather messages to be generated from the partitioning step. In a partition step of first level, the processor may read $vw^1$ from $vs^1$. $vs^1$ may refer to the divided temporary memory region described above and may refer to a window that sequentially slides to a vertex set to identify a vertex connection relation. That is, the window may be a divided memory area. Then, the processor may read $adjw^1$ from $adjs^1$. $adjw^1$ may also refer to a window of the edge list. When the input/output (I/O) for the adjacency list of the $adjw^1$ is completed, the algorithm shown in FIG. 2A may call $adj\_scatter^1$, which is a reply function for the adjacency list. That is, the processor operation may overlap network I/O, remote memory (e.g., external apparatus disk) I/O. Because all the apparatuses perform the partitioning step at the same time, the processor, network, and storage resources of the entire system may completely overlap to perform working.

In the partitioning step, the processor may allocate a global gather buffer $LGB^1$ for each level to support the global gather process in the memory before transmitting update information to another apparatus. When s target vertex is updated in the $adj\_scatter^1$ function, the memory 120 may perform the global gather process to reduce an update stream. Through the above-described process, this disclosure may overlap the gather step and the global gather step.

FIG. 2B is a view illustrating a global gathering operation algorithm according to an embodiment of the disclosure.

Referring to FIG. 2B, the global gathering operation algorithm may accumulate u in the global gather buffer if u may be gathered in the memory 120 for each update u. If the update u cannot be gathered in the memory 120, the update u may be stored in the storage 110. The global gathering operation algorithm may gather messages generated in the gathering step of the apparatuses. After processing both $vs^1$ and adjs¹, the global gathering operation algorithm may wait until all updates are gathered in the memory or storage via a global barrier. Thereafter, the global gathering operation algorithm may perform an operation of gathering update information stored in the storage, and may perform the application operation.

If the apparatus performing the global gathering operation is a producer and the apparatus performing the application operation is a consumer, the memory may additionally allocate a global gather buffer to include two buffers for the producer and the consumer. Then, the apparatus may overlap execution of the gathering step and execution of the application step.

FIG. 2C is a view illustrating an update gather operation algorithm according to an embodiment of the disclosure, and FIG. 2D is a view illustrating an application operation algorithm according to an embodiment of the disclosure.

Referring to FIG. 2C, while a GatherSpilledUpdates function loads updates from the storage and accumulates the loaded updates in the other global gather buffer, the application operation algorithm may immediately perform the application operation using the global gather buffer. The application step may wait until aggregating of the results stored in the storage 110 corresponding to the current source vertex ID range is completed, thereby synchronizing the producer and the consumer. The application operation algorithm may finally call vertex_apply for each vertex of a vertex stream.

Hereinafter, a specific process of performing graph search will be described.

Figure 4:
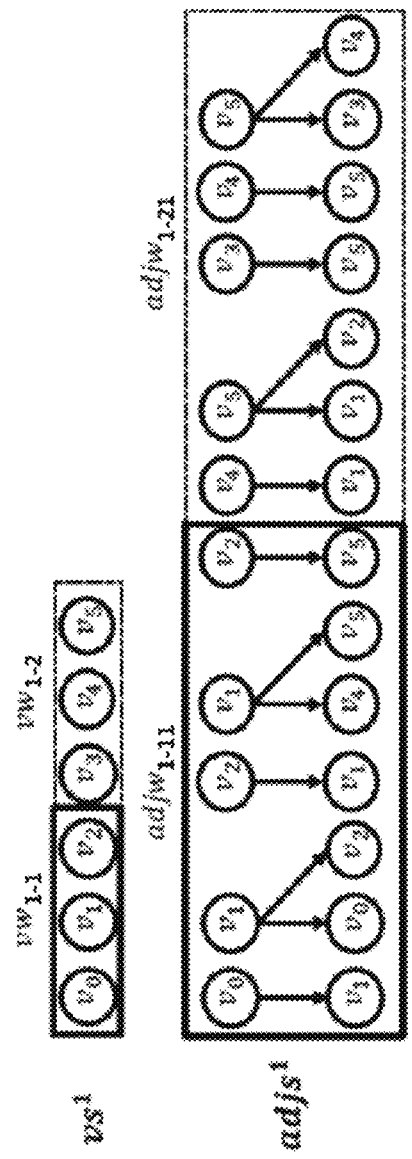
FIG. 4 is a view illustrating a process of processing a page link query according to an embodiment of the disclosure.
Figure 5:
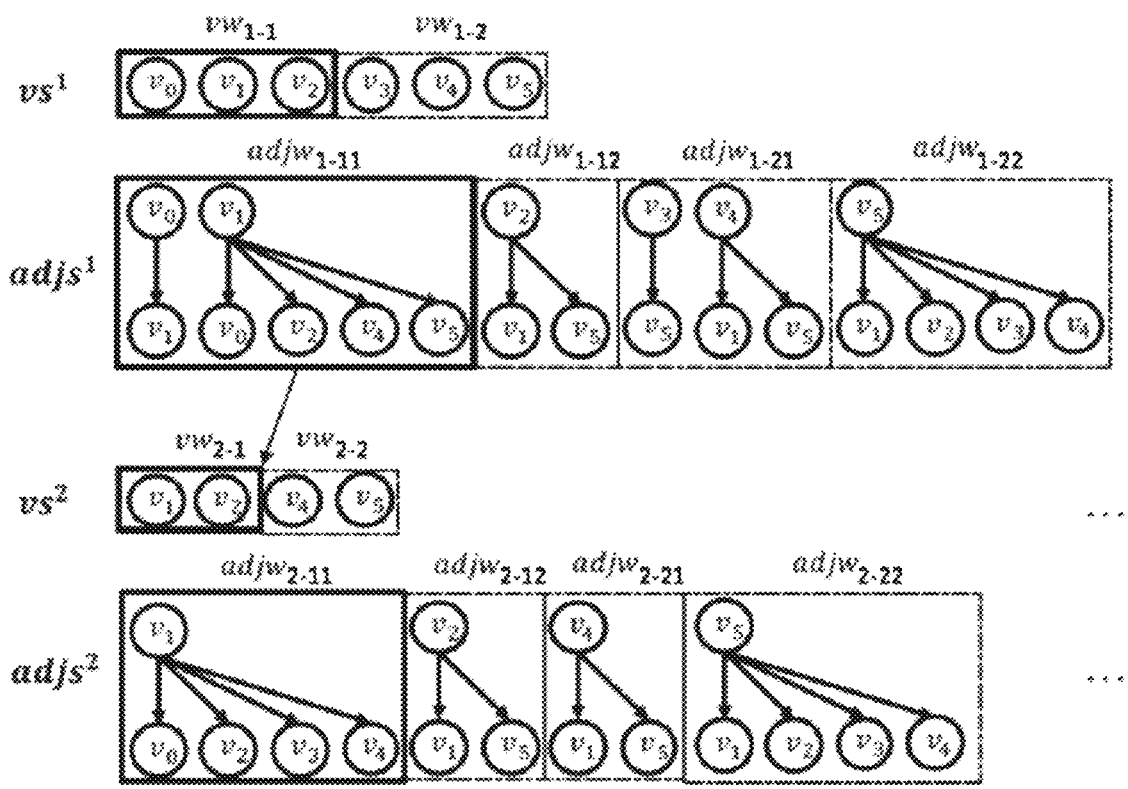
FIG. 5 is a view illustrating a process of processing a triangular counting query according to an embodiment of the disclosure.

FIG. 3 is a view illustrating an embodiment of a data graph, FIG. 4 is a view illustrating a process of processing a page link query according to an embodiment of the disclosure, and FIG. 5 is a view illustrating a process of processing a triangular counting query according to an embodiment of the disclosure.

The fact that vertex v is k-hop reachable from another vertex u means that there is a path whose length from u to v is less than or equal to k. Walk refers to a general case that the same vertex may appear multiple times in an array in a path signifying a sequence of vertices.

A subgraph including neighboring vertices separated by k-hop from each vertex is called a k-hop neighborhood. A k-walk neighborhood query may be defined as a general query class that supports graph search in the k-hop neighborhood. The k-walk neighborhood query requires performing of calculation on the walk that leads to all the vertices included in the k-hop neighborhood of each vertex. For example, a page rank query is a 1-walk neighborhood query, and a triangle search query is a 2-walk neighborhood query.

An example of processing a page rank query for the graph of FIG. 3 will be described with reference to FIGS. 3 and 4. Referring to FIG. 4, source vertices may be loaded into the memory on the basis of a memory requirement. In an embodiment, the memory requirement may be set on the basis of the number of vertices. FIG. 3 shows six vertices v0 to v5, and v0 to v2 (vw1-1) and v3 to v5 (vw1-2) may be separately processed. First, v0 to v2 (vw1-1) may be loaded into the memory. Also, adjs¹ may be partitioned to fit a vertex window including the source vertices of the edge list. vw1-1 is loaded with an attribute value of the vertices corresponding to the vertices v0 to v2, and the page rank value may be updated as the edge list of adjw1-11 is processed. Next, vw1-2 and adjw1-21 may be processed by sliding a window of vs¹ and adjs¹. Thereafter, a gathering process of aggregating the generated update information is performed, and an application process of updating the vertex value with the aggregated value may be performed. vw1-2 and adjw1-21 may be loaded into the memory after vw1-1 and adjw1-11 are processed. Alternatively, vw1-2 and adjw1-21 may be loaded into the memory together with vw1-1 and adjw1-11 and then processed by sliding the window to vw1-2 and adjw1-21.

An example of processing a triangular counting query for the graph of FIG. 3 will be described with reference to FIGS. 3 and 5. The triangular counting query, which is a 2-hop neighborhood query, may be processed by overlaying two vertex windows and a pair of adjacency list windows.

As described above, the source vertices may be loaded into the memory on the basis of the memory requirement. At the first level, vw1-1 and adjw1-11 may be loaded into memory. However, the processor may perform one operation on the basis of the set number of edges. FIG. 5 illustrates a case in which five edges may be processed in one operation. In FIG. 5, because five edges may be processed, the vertex window is located at vw1-1 and the edge list window may be located at ajdw1-11. An arrival vertex may be identified along an edge that satisfies a partial order constraint among the edges loaded in adjw1-11. The identified arrival vertices may include vs² and may be processed at the second level. At the second level, vw2-1 and adjw2-11 may be loaded. Backward traversal is performed from each vertex u loaded at the second level and a parent vertex v at the first level may be retrieved. Thereafter, an intersection operation is performed on the edge list of u and v to identify a triangle graph.

That is, the memory 120 may load subgraph data including a predetermined number of source vertices and an edge list based on the source vertices on the basis of the memory requirement among the graph data stored in the storage 110. For example, the memory requirement may be set on the basis of the number of vertices and may also be set on the basis of the number of edges. The processor 130 may perform a first level process to identify a first arrival vertex connected to the source vertices on the basis of the source vertices and the edge list loaded into the memory 120. As shown in FIG. 5, the memory may load vw1-1, adjw1-11, and adjw1-12. Because five edges may be processed, the processor may place the vertex window at vw1-1 and the edge list window at adjw1-11. The first arrival vertex may be identified on the basis of vw1-1 and adjw1-11 loaded in the memory 120. Thereafter, the processor may maintain the position of the vertex window at vw1-1 and slide the edge list window to adjw1-12 to identify the first arrival vertex based on v2.

The memory 120 may load the edge list on the basis of the source vertices (v1, v2) of which the first arrival vertex is identified. At the second level, the processor 130 may identify a second arrival vertex on the basis of the identified source vertices of which the first arrival vertex is identified. Therefore, as shown in FIG. 5, the memory 120 may load the vertices v1 and v2 into the region vw2-1. The processor 130 may locate the vertex window in the vw2-1 region and locate the edge list window at adjw2-11 to identify the second arrival vertex for v1. The processor 130 may then maintain the vertex window position and slide the edge list window to adjw2-12 to identify a second arrival vertex for v2. Through the above-described process, the processor 130 may perform a triangular search query on the basis of the source vertices v0, v1, v2, the identified first arrival vertex, and the identified second arrival vertex.

The memory 120 may maintain the vertices and edge list loaded at the first level. The memory 120 may then remove the vertex and edge list loaded at the second level except for the retrieved triangle information.

The processor 130 may also perform the triangle search query on other vertices in the same way. The memory 120 loads the vertices of vw1-2 and the processor 130 may repeat the above process to perform the triangle search query.

Meanwhile, the processor 130 may arrange the source vertices and the first arrival vertex in order on the basis of the number assigned to each of the source vertices and the first arrival vertex at the first level. In an embodiment, the processor 130 may arrange the source vertices and the first arrival vertex in ascending order on the basis of the numbers assigned to the source vertices and the first arrival vertex at the first level.

If the number of the source vertex is less than the number of the first arrival vertex, the processor 130 may identify a connection relation on the basis of an adjacent source vertex have a number greater than the source vertex number. If the number of the first arrival vertex is smaller than the number of the source vertex, the processor 130 may identify a connection relation on the basis of an adjacent first arrival vertex having a number larger than the number of the first arrival vertex.

Further, the processor 130 may arrange the source vertex of which the first arrival vertex is identified and the second arrival vertex in ascending order on the basis of the numbers assigned to the source vertices of which the first arrival vertex is identified and the second arrival vertex at the second level. If the number of the source vertex of which the first vertex is identified is smaller than the number of the second arrival vertex, the processor 130 may identify a connection relation on the basis of a source vertex of which an adjacent first source vertex of a number larger than the number of the source vertex of which the first arrival vertex is identified. If the number of the second arrival vertex is smaller than the number of the source vertex of which the first arrival vertex is identified, the processor 130 may identify a connection relation on the basis of an adjacent second arrival vertex having a number larger than the number of the second arrival vertex.

Alternatively, the processor 130 may arrange the numbers of the source vertex, the source vertex of which the first arrival vertex is identified, and the second arrival vertex in order and identify a connection relation on the basis of a median value.

In this disclosure, because a connection relation is identified on the basis of the source vertices and the edge list, bit operations on all the vertices are not necessary. Also, because the vertices are sequentially arranged, repeated calculations may be avoided. Therefore, the present disclosure may have advantages in a calculation speed.

FIG. 5 illustrates a triangle query process according to an embodiment of the disclosure. However, in the disclosure, a query operation may also be performed to recognize a general connection relation including a polygonal connection relation such as a square or pentagon by adding a level and repeating the same process.

Meanwhile, the disclosure may increase overall processing efficiency by using hardware resources in parallel.

Figure 6:
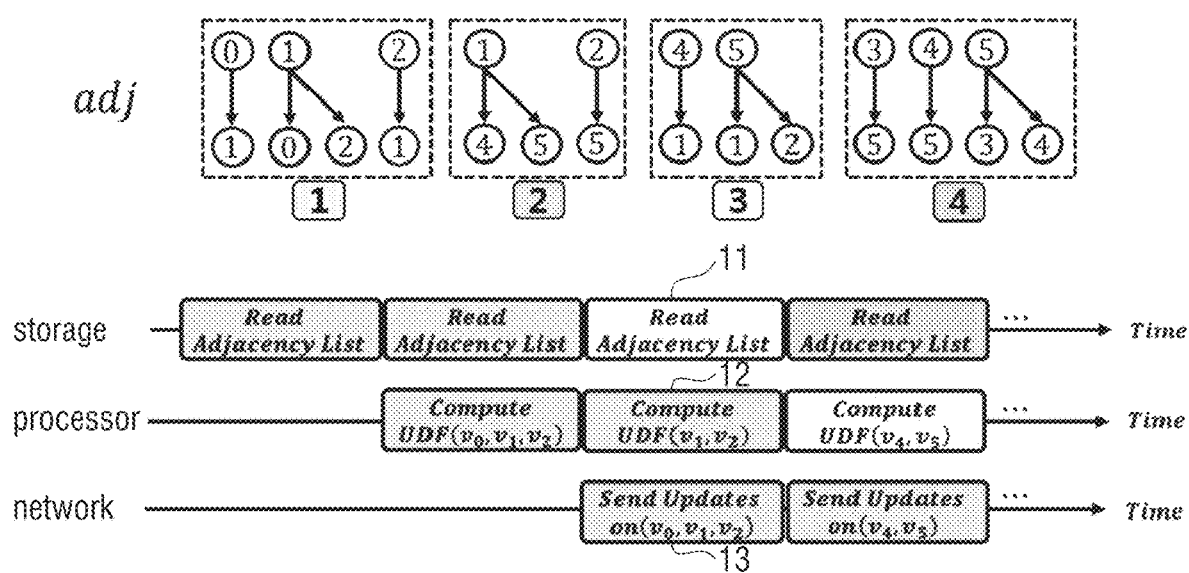
FIG. 6 is a view illustrating a hardware parallel processing process according to an embodiment of the disclosure.

FIG. 6 is a view illustrating a hardware parallel processing process according to an embodiment of the disclosure.

As described above, the graph data may be processed by performing a user-defined function (UDF) on each vertex in the apparatus on the basis of the UDF defined by a user. In processing the UDF in the apparatus, the processor 130 may generate a message (update) to a target vertex of each edge while going around the edge list, the storage may load the vertex and edge list to the memory 120, and the communication interface may transmit the message generated in the UDF to another apparatus through a network.

Therefore, when the storage 110, the processor 130, and the communication interface perform different operations at the same time, hardware resources may be efficiently used, and thus, an effect of graph data processing may be maximized.

As shown in FIG. 6, the storage may load the edge list to be processed next, the processor may process the UDF, and the communication interface may transmit the update information to another apparatus.

In an embodiment, the storage may load an edge list based on vertices included in a region where a window is to be placed next into the memory (11). At the same time, the processor may identify an arrival vertex connected to a vertex in a region where the window is currently located (12). At the same time, the communication interface may transmit update information on the arrival vertex identified in the region where the window was previously located to another apparatus via the network (13). As described above, the storage may prepare a next operation, the processor performs the current operation, and the communication interface carries out the processing of the result of the previous operation at the same time, whereby the disclosure may efficiently utilize the hardware resources and increase the graph data processing effect.

Meanwhile, large-scale graph data may be distributed and stored in various apparatuses. That is, a plurality of graph data processing apparatuses may be implemented as one system. Therefore, the partitioned graph data must be arranged to be balanced, without being deflected in the plurality of apparatuses. Hereinafter, a method of partitioning and storing graph data in a plurality of apparatuses will be described.

Figure 7:
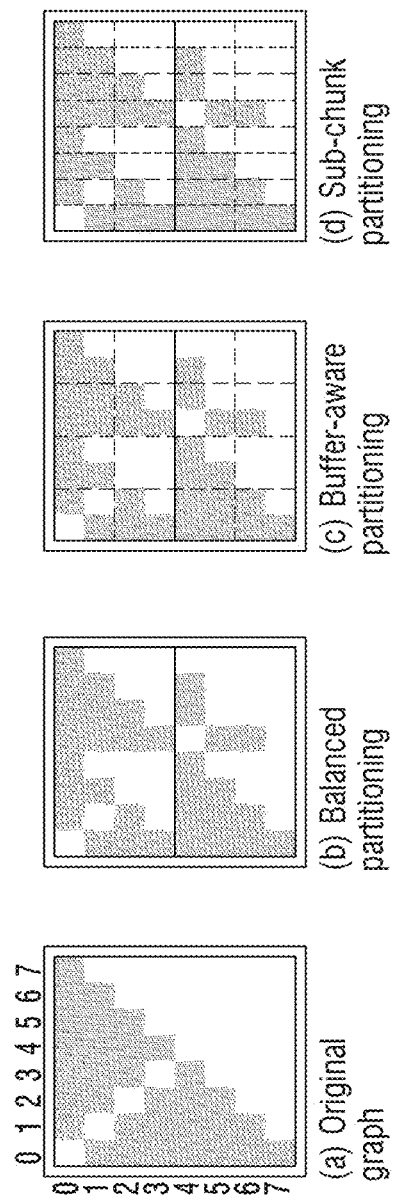
FIG. 7 is a view illustrating an embodiment in which graph data is stored in a distributed manner in a balanced way in a plurality of apparatuses.

FIG. 7 is a view illustrating an embodiment in which graph data is distributed and stored in a balanced manner in a plurality of apparatuses.

Referring to FIG. 7A, an input graph having a deflected degree distribution is illustrated. A colored space in an i-th row and a j-th column indicates that there is an edge oriented from a vertex ID i to a vertex ID j. To balance the number of edges between apparatuses and the number of vertices with high degrees and those with low degrees, vertices may be aligned in degree value order and distributed to each apparatus in a round-robin manner. If there are p apparatuses, the graph data may be partitioned into p pieces. Then, successive vertex IDs are assigned to the vertices allocated to each apparatus, and degree order information of the vertices may be identified from the vertex IDs. Vertices in each apparatus may be assigned vertex IDs in decreasing order of the degree values, and a lower vertex ID may be assigned as a vertex has a high degree value in each apparatus.

FIG. 7B shows a result of balanced distribution in two apparatuses.

Next, the edges in each apparatus may be divided into a source vertex ID region and a target vertex ID region having the same size. The source vertices may be divided into q regions, and the target vertices may be divided into p*q regions. q may be determined by a size of the memory buffer needed to process the query on each apparatus and an available size of the memory. Each edge partition may be called an edge chunk, and each apparatus may have q*pq edge chunks. FIG. 7(c) shows the partitioning result when q is 2.

In addition, it is possible to reduce a synchronization cost between the NUMA nodes by a compare-and-swap (CAS) operation in the gather operation of the memory. Each edge chunk may be further partitioned into a target vertex ID region. Each edge chunk may be partitioned into r edge chunks, and r may be equal to the number of NUMA nodes. The number of edges between respective partial chunks may also be adjusted to be balanced using degree information of the vertices. FIG. 7(d) shows a result of partitioning when there are two NUMA nodes per apparatus.

Figure 8A:
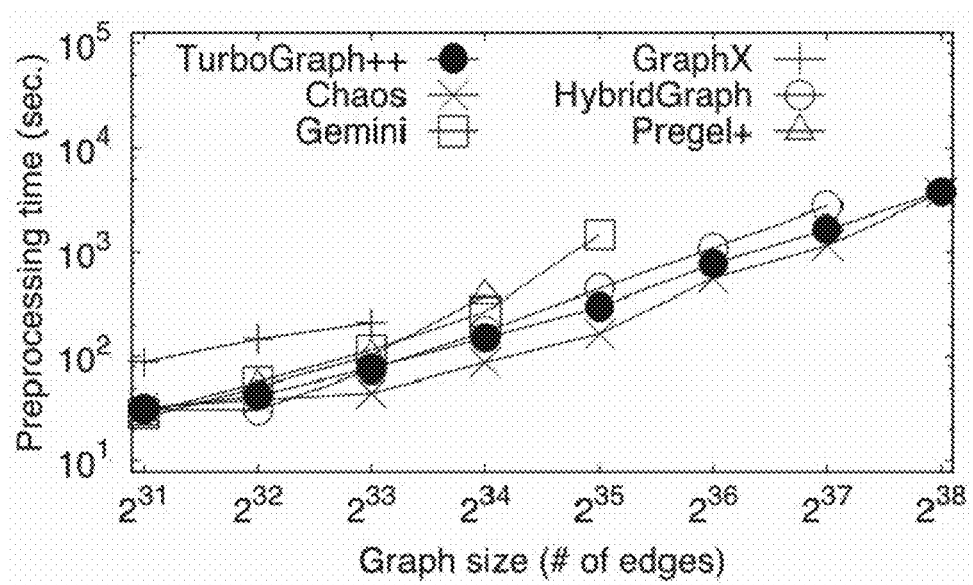
FIG. 8A is a view illustrating results of a preprocessing time test of various systems.
Figure 8B:
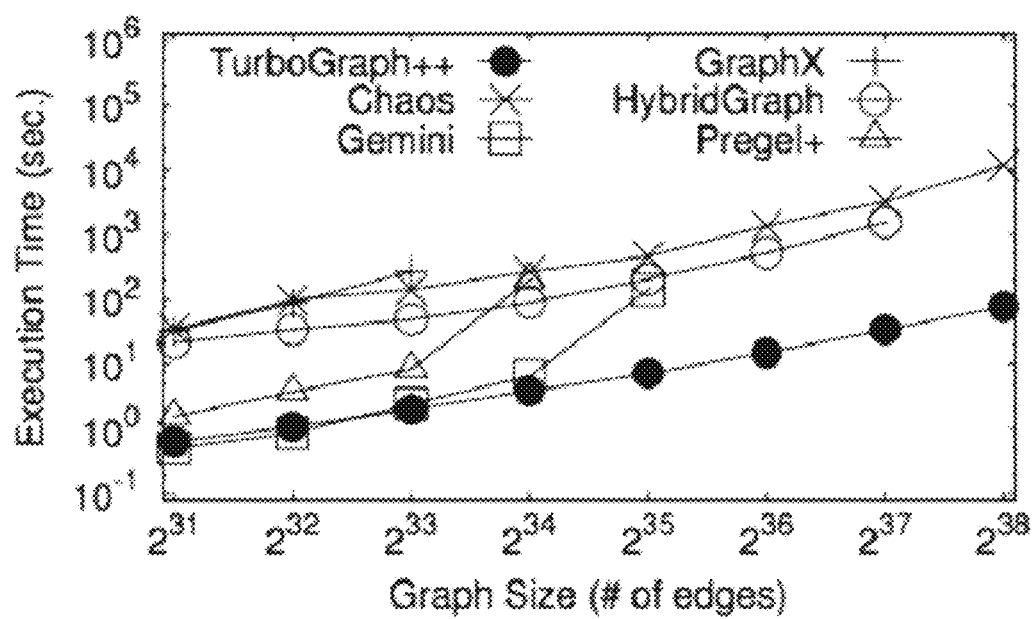
FIG. 8B and FIG. 8C are views illustrating results of query processing time test of various systems for large-scale graph data.
Figure 8C:
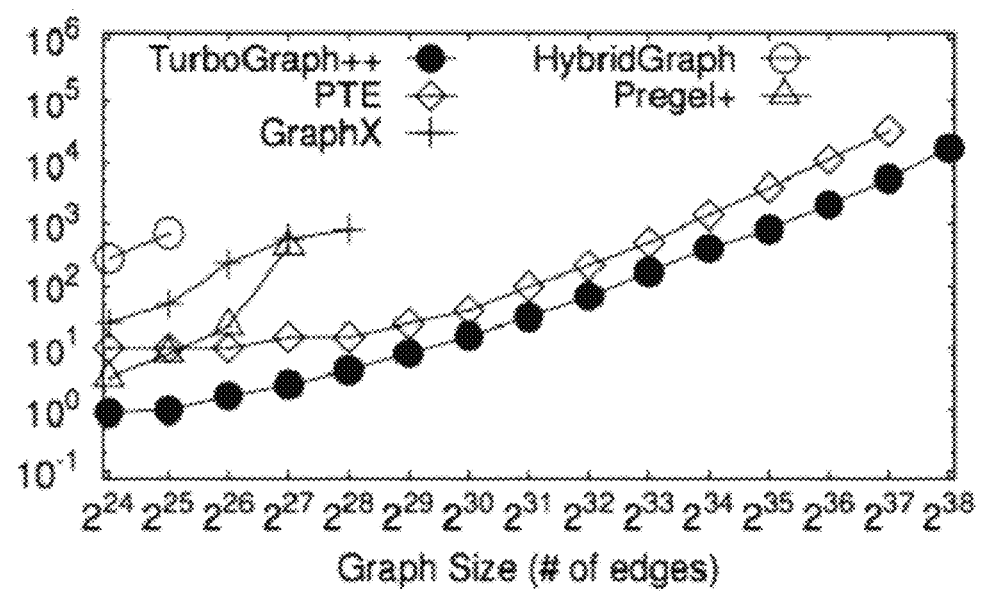
Figure 8D:
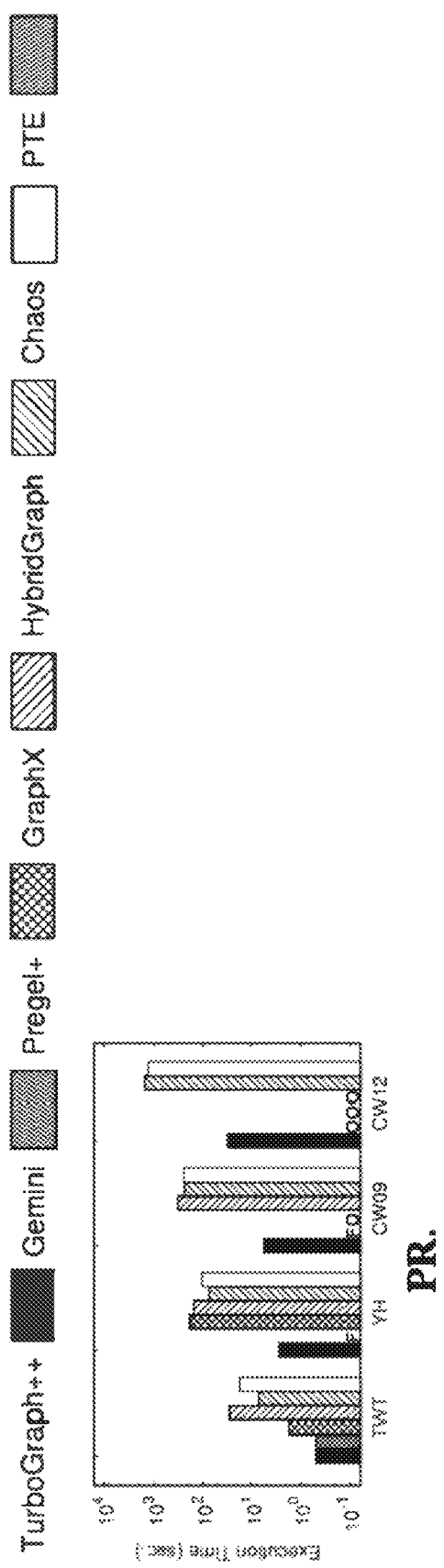
FIGS. 8D to 8H are views illustrating results of query processing time test of various systems for public graph data existing in reality.
Figure 8E:
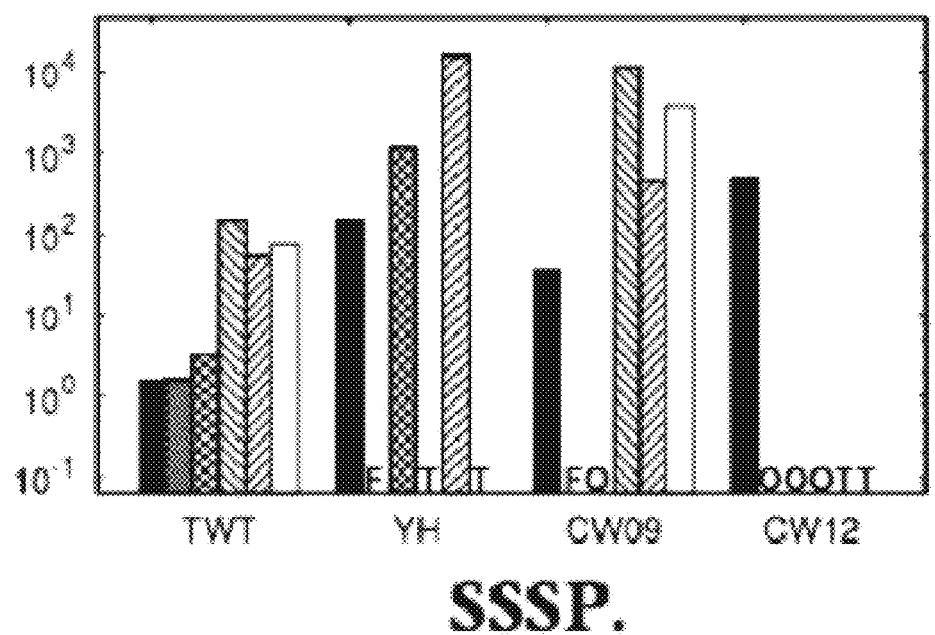
Figure 8F:
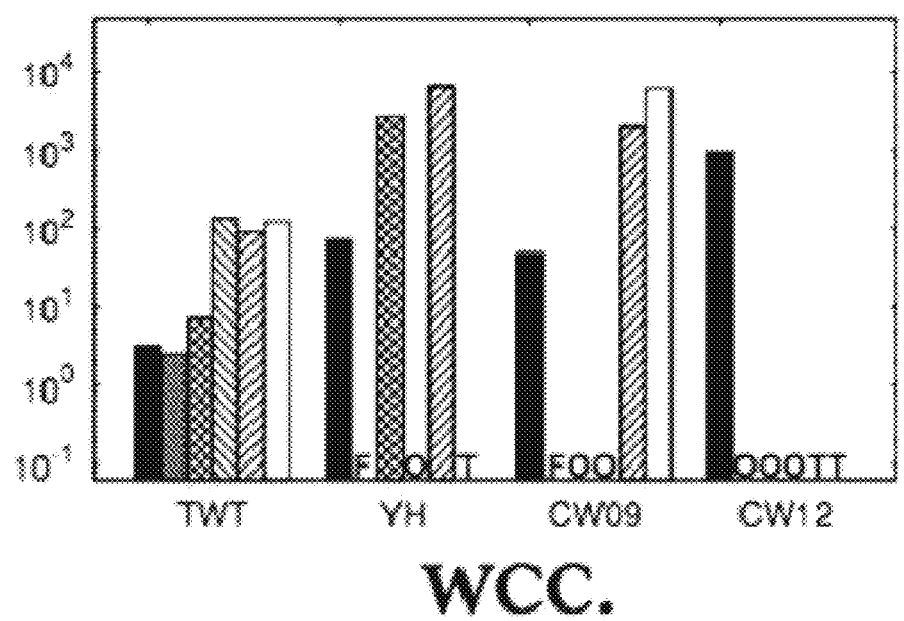
Figure 8G:
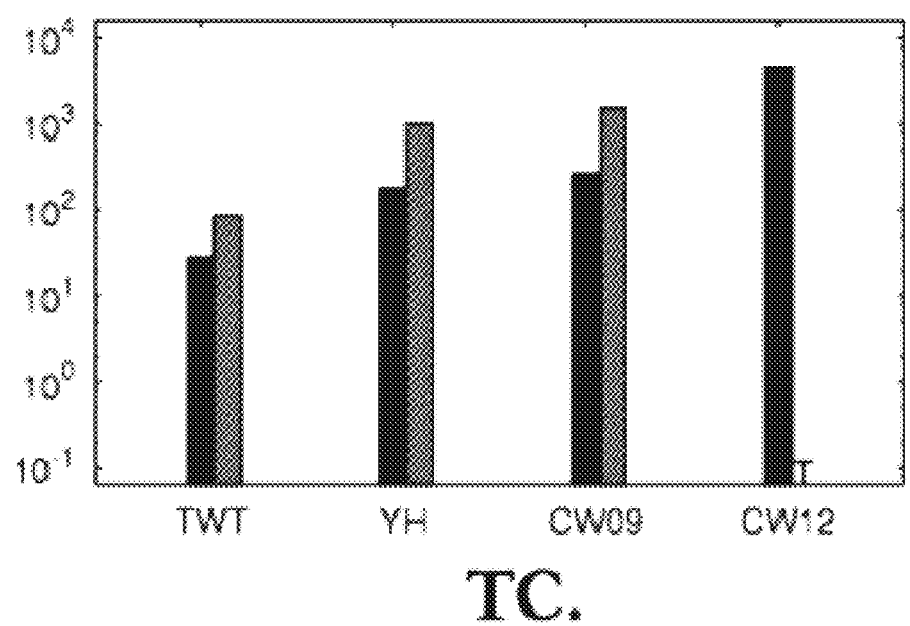
Figure 8H:
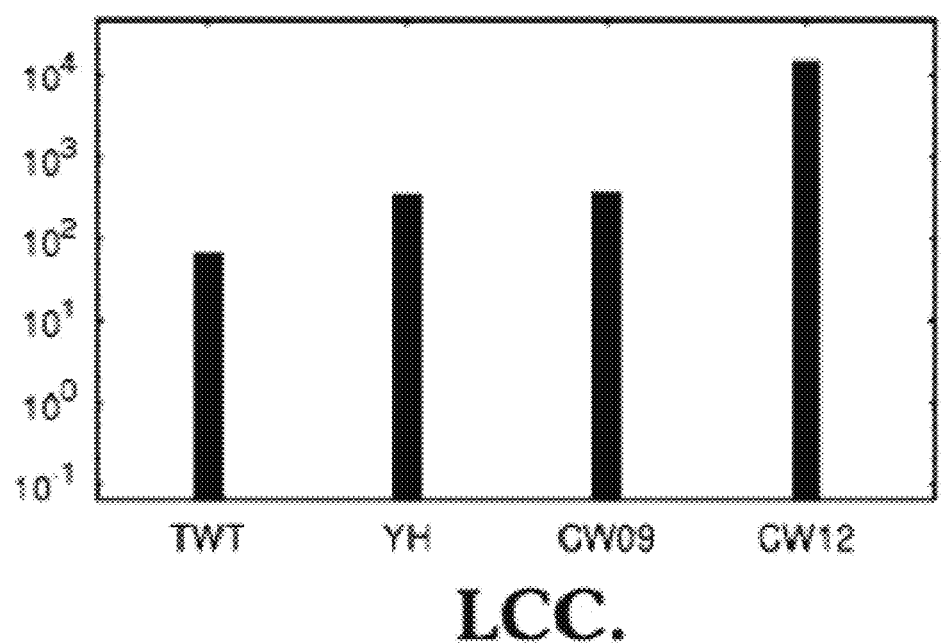

FIG. 8A is a graph showing results of preprocessing time tests of various systems, FIGS. 8B and 8C are graphs showing results of query processing time tests of various systems for large-scale graph data, and FIGS. 8D to 8H are graphs showing results of query processing time tests of various systems for public graph data existing in reality.

Referring to FIG. 8A, TurboGraph++ is results of the disclosure, and a result in which a preprocessing time of the disclosure is similar to a preprocessing time of the latest graph processing engines is illustrated. Referring to FIGS. 8B to 8H, TurboGraph++ is results of the disclosure, and a result in which a query processing time of the disclosure exhibits superior performance compared to the query processing execution time to which other techniques are applied.

Various embodiments of the graph data processing apparatus and the graph data processing method have been described so far. A flowchart of the graph data processing method is described below.

Figure 9:
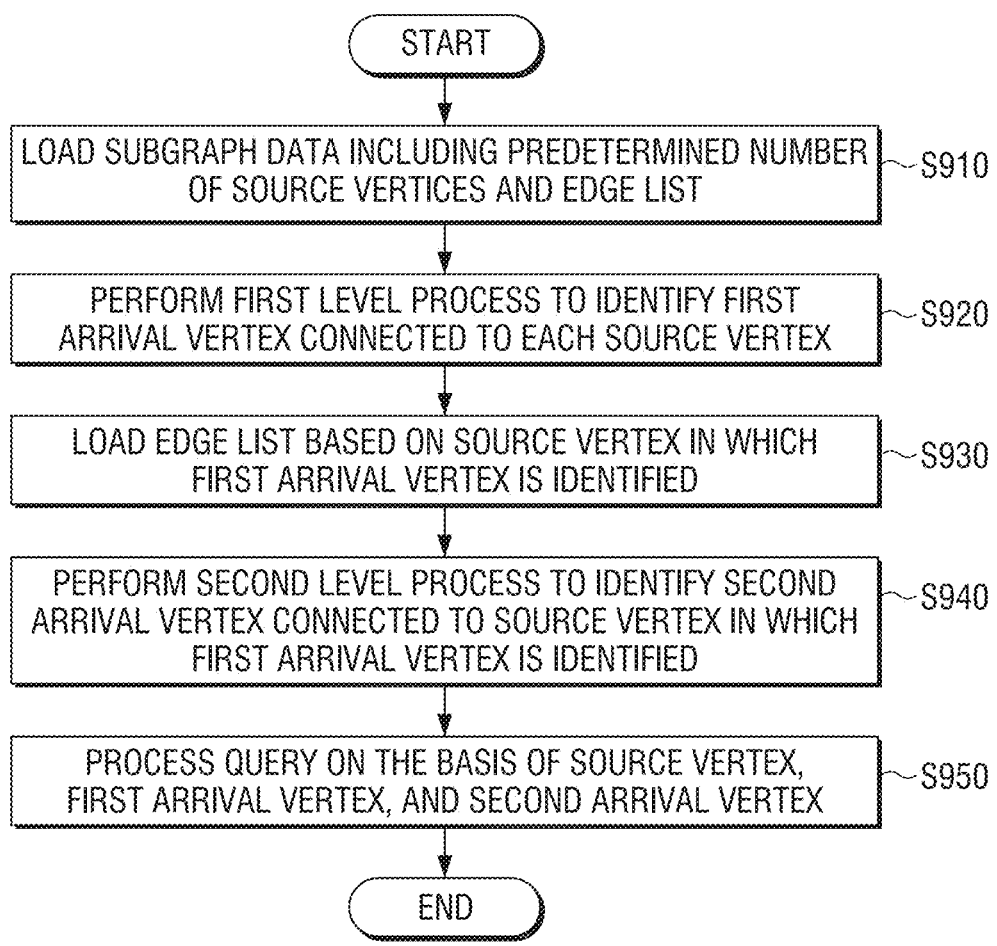
FIG. 9 is a flowchart illustrating a graph data processing method according to an embodiment of the disclosure.

FIG. 9 is a view illustrating a flowchart of a graph data processing method according to an embodiment of the disclosure.

The graph data processing apparatus may load the subgraph data including a predetermined number of source vertices on the basis of a memory requirement among graph data including a plurality of vertices and edges stored in the storage and an edge list based on the source vertices (S910).

The graph data processing apparatus may perform a first level process to identify a first arrival vertex connected to each source vertex (S920). The graph data processing apparatus may set a first window including edges within a predetermined number that are connected to the source vertices. The graph data processing apparatus may identify the first arrival vertex on the basis of the source vertices included in a region where the first window is located and the edge list, while sequentially sliding the set first window.

The graph data processing apparatus may load the edge list on the basis of a source vertex of which a first arrival vertex is identified (S930). The graph data processing apparatus may perform a second level process to identify a second arrival vertex connected to the source vertex of which the first arrival vertex is identified (S940). The graph data processing apparatus may set a second window including an edge connected to the source vertex on the basis of the source vertex of which the first arrival vertex is identified. The graph data processing apparatus may identify a second arrival vertex on the basis of the source vertex that is included in a region where the second window is located and the first arrival vertex is identified and the edge list, while sequentially sliding the set second window (S940).

The graph data processing apparatus may process the query on the basis of the source vertex, the first arrival vertex, and the second arrival vertex (S950).

Meanwhile, in an embodiment, the triangle query processing process of the graph data processing apparatus has been described. However, in the disclosure, a query operation regarding a connection relation of a polygon such as a square or a pentagon may also be performed by adding a level and repeating the same process. That is, the graph data processing apparatus may repeat the same process up to the k-th level according to the requested polygon. For example, the graph data processing apparatus may perform up to a third level process (k=3) when a square query processing request is input, and may perform up to a fourth level process when a pentagon query processing request is input (k=4). That is, k may be one less than the number (n) of vertices of the requested polygon (k=n−1).

The graph data processing method according to various embodiments described above may be provided as a computer program product. The computer program product may include a software program itself or a non-transitory computer readable medium in which the software program is stored.

The non-transitory computer readable medium is a medium that semi-permanently stores data therein, rather than a medium storing data for a short time such as a register, a cache, a memory, or the like, and is readable by an apparatus. In detail, various applications or programs described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

While the present invention has been described and illustrated with reference to the preferred exemplary embodiments, the present invention is not limited to the above-described specific exemplary embodiments, and it will be understood that various modifications and variations may be made therein by those skilled in the art to which the present invention pertains, without departing from the scope of the present invention as defined by the appended claims. These modifications and variations should not be understood separately from the technical spirit and prospect of the present invention.

What is claimed is:

1. A graph data processing method comprising:
  loading subgraph data, corresponding to a memory requirement, including a predetermined number of source vertices on the basis of the memory requirement among graph data including a plurality of vertices and edges stored in a storage and an edge list based on the source vertices;
  based on the predetermined number of source vertices being identified, performing a first level process to identify a first arrival vertex connected to each of the source vertices;
  based on the first level process being performed, loading the edge list on the basis of a source vertex of which the first arrival vertex is identified, and performing a second level process to identify a second arrival vertex connected to the source vertex of which the first arrival vertex is identified; and
  processing a query on the basis of the source vertex, the first arrival vertex, and the second arrival vertex,
    wherein the processing of the query includes processing a polygon connection relation query having n apexes greater than 3 apexes and a connection relation pattern query on the basis of the source vertex, the frist arrival vertex, and the second arrival vertex.

2. The graph data processing method as claimed in claim 1, further comprising:
  loading the edge list on the basis of a source vertex on which a (k-1)-th arrival vertex is identified; and performing k-th level process to identify a k-th arrival vertex connected to a source vertex of which the (k-1)-th arrival vertex is identified,
  wherein, k is a natural number of $3 \le k \le n-1$.

3. The graph data processing method as claimed in claim 1, wherein the performing of the first level process includes:
  setting a first window including a predetermined number or less of edges connected to the source vertices, sequentially sliding the set first window, and identifying the first arrival vertex on the basis of the source vertex included in a region where the first window is located and the edge list.

4. The graph data processing method as claimed in claim 3, wherein the performing of the second level process includes:
  setting a second window including an edge connected to the source vertex on the basis of the source vertex of which the first arrival vertex is identified, sequentially sliding the set second window, and identifying a second arrival vertex on the basis of the source vertex that is included in a region where the first window is located and the first arrival vertex is identified and the edge list.

5. The graph data processing method as claimed in claim 3, wherein
  the performing of the second level process includes identifying, by a processor, a second arrival vertex connected to the source vertex of which the first arrival vertex is identified in a currently located region of the first window, loading, by the storage, an edge list based on the source vertex of which the first arrival vertex corresponding to a region where the second window is to be located to the memory, and transmitting, by a communication interface, update information of a second arrival vertex identified in a previously located region of the second window, whereby the storage, the processor, and the communication interface to operate simultaneously in parallel.

6. The graph data processing method as claimed in claim 1, wherein
  the performing of the first level process includes arranging the source vertex and the first arrival vertex in ascending order on the basis of numbers respectively assigned to the source vertex and the first arrival vertex, and
  the performing of the second level process includes arranging the source vertex of which the first arrival vertex is identified and the second arrival vertex in ascending order on the basis of numbers respectively assigned to the source vertex of which the first arrival vertex is identified and the second arrival vertex.

7. The graph data processing method as claimed in claim 6, wherein the performing of the first level process includes identifying a connection relation on the basis of an adjacent source vertex having a number larger than the number of the source vertex if the number of the source vertex is smaller than the number of the first arrival vertex and identifying a connection relation on the basis of an adjacent first arrival vertex having a number larger than the number of the first arrival vertex if the number of the first arrival vertex is smaller than the number of the source vertex, and
  the performing of the second level process includes identifying a connection relation on the basis of a source vertex of which an adjacent first arrival vertex having a number larger than the number of the source vertex of which the first arrival vertex is identified if the number of the source vertex of which the first arrival vertex is identified is smaller than the number of the second arrival vertex, and identifying a connection relation on the basis of an adjacent second arrival vertex having a number larger than the number of the second arrival vertex if the number of the second arrival vertex is smaller than the number of the source vertex of which the first arrival vertex is identified.

8. A graph data processing apparatus comprising:
  a storage configured to store graph data including a plurality of vertices and edges;
  a memory configured to load subgraph data on the basis of a memory requirement among the graph data; and
  a processor configured to process a query on the basis of the loaded subgraph data,
  wherein the memory loads a predetermined number of source vertices of the subgraph data, corresponding to a memory requirement, and an edge list based on the source vertices and loads an edge list based on a source vertex of which a first arrival vertex is identified, and
  the processor is further configured to:
  based on the predetermined number of source vertices being identified, perform a first level process to identify a first arrival vertex connected to each of the source vertices on the basis of the edge list based on the source vertices loaded into the memory,
  based on the first level process being performed, perform a second level process to identify a second arrival vertex connected to the source vertex of which the first arrival vertex is identified on the basis of the edge list based on the source vertex of which the first arrival vertex is identified loaded into the memory, and
  processes a ploygon connection relation query having n apexes greater than 3 apexes and a connection relation pattern query on the basis of the source vertex, the first arrival vertex, and the second arrival vertex.

9. The graph data processing apparatus as claimed in claim 8, wherein
  the memory loads the edge list on the basis of a source vertex on which a (k-1)-th arrival vertex is identified, and
  the processor performs k-th level process to identify a k-th arrival vertex connected to a source vertex of which the (k-1)-th arrival vertex is identified
  wherein k is a natural number of $3 \le k \le n-1$.

10. The graph data processing apparatus as claimed in claim 8, wherein,
  in the first level process, the processor sets a first window including a predetermined number or less of edges connected to the source vertices, sequentially slides the set first window, and identifies the first arrival vertex on the basis of the source vertex included in a region where the first window is located and the edge list.

11. The graph data processing apparatus as claimed in claim 10, wherein,
  in the second level process, the processor sets a second window including an edge connected to the source vertex on the basis of the source vertex of which the first arrival vertex is identified, sequentially slides the set second window, and identifies a second arrival vertex on the basis of the source vertex that is included in a region where the first window is located and the first arrival vertex is identified and the edge list.

12. The graph data processing apparatus as claimed in claim 10, further comprising:
  a communication interface,
  wherein the processor identifies a second arrival vertex connected to the source vertex of which the first arrival vertex is identified in a currently located region of the first window in the second level process, controls the storage to load an edge list based on the source vertex of which the first arrival vertex corresponding to a region where the second window is to be located to the memory, and controls the communication interface to transmit update information of a second arrival vertex identified in a previously located region of the second window, whereby the storage, the processor, and the communication interface simultaneously operate in parallel.

13. The graph data processing apparatus as claimed in claim 8, wherein,
in the first level process, the processor arranges the source vertex and the first arrival vertex in ascending order on the basis of numbers respectively assigned to the source vertex and the first arrival vertex, and
in second level process, the processor arranges the source vertex of which the first arrival vertex is identified and the second arrival vertex in ascending order on the basis of numbers respectively assigned to the source vertex of which the first arrival vertex is identified and the second arrival vertex.

14. The graph data processing apparatus as claimed in claim 13, wherein,
in the first level process, the processor identifies a connection relation on the basis of an adjacent source vertex having a number larger than the number of the source vertex if the number of the source vertex is smaller than the number of the first arrival vertex, and identifies a connection relation on the basis of an adjacent first arrival vertex having a number larger than the number of the first arrival vertex if the number of the first arrival vertex is smaller than the number of the source vertex, and
in the second level process, the processor identifies a connection relation on the basis of a source vertex of which an adjacent first arrival vertex having a number larger than the number of the source vertex of which the first arrival vertex is identified if the number of the source vertex of which the first arrival vertex is identified is smaller than the number of the second arrival vertex, and identifies a connection relation on the basis of an adjacent second arrival vertex having a number larger than the number of the second arrival vertex if the number of the second arrival vertex is smaller than the number of the source vertex of which the first arrival vertex is identified.

15. A system comprising a plurality of the graph data processing apparatuses of claim 8, wherein each of the plurality of graph data processing apparatuses stores graph data including source vertices and edges in a distributed manner according to a round robin method on the basis of the number of the source vertices and the edges.

* * * * *